United States Patent
Monville

(10) Patent No.: US 8,201,315 B2
(45) Date of Patent: Jun. 19, 2012

(54) METHOD FOR CONTROLLING TENSILE STRESS OF A SHANK, SUCH AS A SCREW OR DOWEL PIN, AND DEVICE FOR CARRYING OUT SAID METHOD

(75) Inventor: Jean-Michel Monville, Les Essarts le Roi (FR)

(73) Assignee: Aktiebolaget SKF, Göteborg (SE)

( * ) Notice: Subject to any disclaimer, the term of this patent is extended or adjusted under 35 U.S.C. 154(b) by 982 days.

(21) Appl. No.: 11/628,883

(22) PCT Filed: May 25, 2005

(86) PCT No.: PCT/FR2005/001292
§ 371 (c)(1),
(2), (4) Date: Jul. 9, 2008

(87) PCT Pub. No.: WO2006/000677
PCT Pub. Date: Jan. 5, 2006

(65) Prior Publication Data
US 2009/0013518 A1   Jan. 15, 2009

(30) Foreign Application Priority Data
Jun. 2, 2004   (FR) ..................... 04 05952

(51) Int. Cl.
*B21D 39/00* (2006.01)
*B23P 21/00* (2006.01)
(52) U.S. Cl. ........................... 29/452; 29/705
(58) Field of Classification Search ............ 29/452, 29/407.01, 407.04, 407.08, 720, 705; 73/591, 73/761
See application file for complete search history.

(56) References Cited

U.S. PATENT DOCUMENTS
3,008,362 A  11/1961  Tucker, Jr.
3,965,565 A   6/1976  Fujii
(Continued)

FOREIGN PATENT DOCUMENTS
FR  2580742  10/1986
(Continued)

OTHER PUBLICATIONS

French Search Report for corresponding French Application No. 0405952 mailed Jan. 11, 2005; 1 page.
(Continued)

*Primary Examiner* — John C Hong
(74) *Attorney, Agent, or Firm* — Meyertons, Hood, Kivlin, Kowert & Goetzel, P.C.; Eric B. Meyertons

(57) ABSTRACT

In a method for controlling tensile stress of a clamping rod, such as a screw or pin, by the axial extension of the rod and the positioning of at least one retaining member, before the rod is released, such that the latter is blocked at the two ends of the useful clamping length with a residual clamping tensile force, measurements are made which represent the elongation of the rod in the stretched state under a measured extension force and of the rod after release in relation to the rod before extension, by comparing values supplied by at least one sensor during extension and after release with a reference value supplied by this sensor before extension, and, on the basis of these data, a residual clamping force in the useful clamping length of the released rod after extension is calculated.

17 Claims, 3 Drawing Sheets

U.S. PATENT DOCUMENTS

| | | | |
|---|---|---|---|
| 4,020,720 A | 5/1977 | Fujii | |
| 4,029,186 A | 6/1977 | De Gennes | |
| 4,175,453 A | 11/1979 | Exner et al. | |
| 4,438,901 A | 3/1984 | Reaneau et al. | |
| 4,471,657 A * | 9/1984 | Voris et al. | 73/597 |
| 4,478,595 A | 10/1984 | Hayakawa et al. | |
| 4,523,742 A | 6/1985 | Reneau | |
| 4,608,741 A | 9/1986 | Mallet | |
| 4,708,036 A | 11/1987 | Vossbrinck | |
| 4,815,867 A | 3/1989 | Ladin | |
| 4,854,436 A | 8/1989 | Lassiaz et al. | |
| 4,872,768 A | 10/1989 | Brandenstein et al. | |
| 4,881,629 A | 11/1989 | Gay et al. | |
| 4,998,453 A | 3/1991 | Walton et al. | |
| 5,018,384 A | 5/1991 | Hayashi et al. | |
| 5,264,790 A | 11/1993 | Moretti et al. | |
| 5,372,435 A | 12/1994 | Genero et al. | |
| 5,570,871 A | 11/1996 | Westerfeld | |
| 5,575,568 A | 11/1996 | Rigaux et al. | |
| 5,592,401 A | 1/1997 | Kramer | |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 6,043,643 A | 3/2000 | Message et al. | |
| 6,065,737 A | 5/2000 | Richardson et al. | |
| 6,109,624 A | 8/2000 | Message et al. | |
| 6,167,764 B1 | 1/2001 | Calhoun | |
| 6,323,640 B1 | 11/2001 | Forestiero et al. | |
| 6,338,576 B1 | 1/2002 | Girardin et al. | |
| 6,415,900 B1 | 7/2002 | Lopez et al. | |
| 6,539,336 B1 | 3/2003 | Vock et al. | |
| 6,611,138 B2 | 8/2003 | Vasiloiu | |
| 6,666,784 B1 | 12/2003 | Iwamoto et al. | |
| 6,746,352 B1 | 6/2004 | Poiret et al. | |
| 6,908,229 B2 | 6/2005 | Landrieve et al. | |
| 2003/0002764 A1 | 1/2003 | Pflugner et al. | |
| 2003/0007631 A1 | 1/2003 | Bolognesi et al. | |
| 2005/0124447 A1 | 6/2005 | Message et al. | |
| 2005/0165397 A1 | 7/2005 | Faus et al. | |

FOREIGN PATENT DOCUMENTS

| | | |
|---|---|---|
| FR | 2586098 | 2/1987 |
| FR | 2744506 | 8/1997 |
| GB | 2156082 | 10/1985 |
| GB | 2201745 | 9/1998 |
| JP | 62-278352 | 3/1987 |
| JP | 63-172052 | 7/1988 |
| WO | 9850709 | 11/1998 |
| WO | 0142809 | 5/2001 |
| WO | 02052280 | 7/2002 |
| WO | 2004005937 | 1/2004 |

OTHER PUBLICATIONS

Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.

* cited by examiner

METHOD FOR CONTROLLING TENSILE STRESS OF A SHANK, SUCH AS A SCREW OR DOWEL PIN, AND DEVICE FOR CARRYING OUT SAID METHOD

BACKGROUND OF THE INVENTION

1. Field of the Invention

The present invention relates to the field of the clamping of bolts by cold prestressing and, in particular, to a method for controlling tensile stress of a bolt shank, such as a screw or dowel pin, in order to check whether the shank is sufficiently prestressed at the end of clamping. The invention also relates to a device for carrying out said method.

The deformation energy of the bolt is transferred to the nut bearing on the structure to be assembled. The components are thus held in place with clamping.

2. Description of the Relevant Art

Bolts, comprising a shank, such as a screw or pin, and one or more nuts, are used for assembling a plurality of components of a structure with clamping. It is known, in order to obtain high-quality clamping, to carry out clamping by tensile prestress, in which an extension of a clamping rod is performed with the aid of an actuator, for example a hydraulic jack, then a clamping nut is brought into contact, without a high torque being exerted on a face of the structure to be assembled, and subsequently the extension force on the rod is released. The released rod tends to recover its length at rest, but is blocked by the nut. The deformation energy imparted to the rod during the extension step is transferred to the rod/nut assembly bearing on the structure to be assembled. The components are thus held in place with clamping or prestress.

Such a method avoids tightening a nut by applying a screwing torque to it. This affords higher accuracy in the actual clamping force and has the advantage, on the one hand, of not causing any friction under load of the components to be clamped and therefore of avoiding damaging the surfaces of the components, and, on the other hand, of not generating torsion in the body of the rod, thus reducing the level of equivalent stress in the body of the rod and, moreover, eliminating the risks of inopportune unclamping in the event of vibration. Such a method is highly suited to the clamping of any material, for example alloy steels conventionally used in bolt manufacture, but also stainless steels, titanium or composite materials which are highly sensitive to friction and to seizure and/or torsion.

Once clamping has been carried out, however, it is necessary to ensure that the residual tensile force of the rod, that is to say the prestressing force of the rod which is applied to the structure to be assembled, is sufficient.

A simple control method involves measuring only the tensile or extension force applied to the rod by the actuator in order to bring the nut into contact, and subsequently, depending on the particular application, extrapolating the value of the final residual clamping force obtained after the release of the extension force. This extrapolation takes place generally by means of a graph or with the aid of experimental data. Nevertheless, such a control method does not afford satisfactory accuracy for many applications. It is often necessary, before clamping on site, to conduct tests under conditions similar to those of the application in question, this being especially costly. Furthermore, because of the low accuracy, a margin of error is generally adopted, which usually leads to the provision of oversized bolts.

Another method may be to determine the residual elongation of the rod after release. For this purpose, the residual elongation of the rod is measured before and after clamping by means of a displacement measuring device, such as a tracer-type sensor, for example a comparator or inductive sensor, or an ultrasonic device. Where the comparator or inductive sensor is concerned, it is generally necessary to have a reference gage placed in an axial passage machined at the center of the clamping rod, thus incurring high machining and manufacturing costs.

The document FR-A-2 586 098 describes a device for controlling the tensile elongation of a pin with the aid of a gage, comprising a tracer-type sensor arranged on the adjacent ends of a reference gage and of a pin, the outputs of the tracers being connected to a processing unit, in which an elongation value and a nominal pressure value not to be exceeded are entered.

The measurement of the length of the clamping rod may be carried out alternatively, as mentioned above, with the aid of an ultrasonic sensor measuring the time taken by an ultrasonic wave to execute or more transits between the two ends of the rod. This method requires the use of ultrasonic measuring equipment which is generally highly costly.

These control methods have a disadvantage of requiring prior calibration. Calibration involves determining, for each type of rod of a specific application, the correspondence between the elongation of the part under clamping and the tensile force in the rod. This may prove particularly lengthy and costly in the case of applications employing a large number of clamping rods and where the high level of accuracy required makes it necessary to calibrate each rod which has to be labeled in this way. A practical example is the clamping of nuclear reactor vessels.

Moreover, calibration must be carried out in a laboratory on high-precision traction machines which are costly to put into operation. Furthermore, it is necessary to ensure that the calibration conditions are identical or similar to the clamping conditions in the application in question, so that calibration is relevant.

It will also be noted that the use of sophisticated measurement means, such as ultrasonic sensors or inductive sensors, increases the cost of carrying out the method. This is especially true in applications where there is a plurality of rods which have to be controlled simultaneously.

Finally, with the correspondence between residual elongation and clamping force being defined, it still remains to ascertain, for the particular application, what extension force will have to be applied in order to make it possible to achieve the residual force required for clamping.

SUMMARY OF THE INVENTION

One embodiment is directed to a method for controlling the tensile stress of a rod, which is accurate and reliable, which can be carried out easily at low cost and which does not require any prior calibration.

In an embodiment for controlling tensile stress of a rod, such as a screw or pin, by the axial extension of the rod, and the positioning of at least one retaining member, before the rod is released, such that the latter is blocked at the two ends of the useful clamping length with a residual tensile force in the clamping length, measurements are made which represent the elongation of the rod stretched under a measured extension force and of the rod after release in relation to the rod before extension, that is to say in the state of rest in the absence of force, by comparing values supplied by at least one sensor during extension and after release with a reference value supplied by this sensor before extension. Then, on the basis of these data, a residual clamping force in the useful clamping length of the rod is calculated.

The clamping length is the length of the rod which remains under tension when the rod is released, being blocked by the clamping. The residual force in the clamping length is the actual clamping force which it is appropriate to take into account for an exact estimation of the clamping prestress.

Such a method for controlling the tensile stress of a rod does not require any prior calibration of the rods, since the measurements made are relative measurements. There is therefore no need to ascertain the initial length of the rods. Before an extension step, a reference value of the clamping rod at rest, supplied by the sensor and representing the length of the rod, is recorded, but without this value necessarily making it possible to determine the length of the rod directly. Subsequently, the value supplied by this sensor when the rod is stretched is recorded, and it is compared with the reference value in order to deduce from this an elongation of the rod during extension. After release, the value supplied by this sensor is compared with the reference value in order to deduce from this an elongation of the rod after the release of clamping. It can thus be determined with high accuracy whether the rod is correctly prestressed after the release of clamping.

An extension force applied to the rod can be estimated on the basis of the actuator used for stretching the rod.

Preferably, relative measurements of the elongation of the rod are carried out. Such a method has the advantage of making it possible to calculate the residual clamping force with high accuracy.

Advantageously, relative measurements of the displacement of the upper end of the rod are carried out. By means of such a method, in which relative measurements of the displacement of the upper end of the rod are carried out, a comparator or an inductive sensor may be used, in which case the central hole and measuring gage in the clamping rods may be dispensed with.

In one embodiment, the extension force is applied to the rod by means of a hydraulic actuator, and said extension force is calculated on the basis of the feed pressure and of the area under pressure of the actuator.

The extension force is therefore the result of multiplying the pressure by the area of the piston or pistons of the jack to which the pressure is applied. Of course, it is likewise possible for the force to be measured directly by a force sensor. However, this arrangement entails extra cost.

Advantageously, the residual force in the clamping length of the released rod is determined as a function, in particular a linear function, of an extension force, of an elongation of said useful clamping length of the rod in the stretched state or of a displacement of the upper end of the rod and of a residual elongation of said clamping length of the rod, once released for clamping. The residual clamping force in the useful clamping length of the released rod can thus be calculated on the basis of the applied extension force multiplied by an elongation of the clamping length of the released rod and divided by an elongation of said clamping length of the rod in the stretched state.

Advantageously, the elongation of the useful clamping length of the stretched rod is deduced from the extension force and the elongation of the stretched rod.

In one embodiment, the elongation of the useful clamping length of the stretched rod is deduced during the extension phase by the actuator as the elongation of the stretched rod, from which are subtracted an estimation of the elongation of an additional free length prolonging the useful clamping length of the rod beyond the bearing face of a retaining member and an estimation of the elongation of an engagement length on which a gripping member comes into engagement in order to allow the extension of the rod by means of an actuator.

In one embodiment, the elongation of an additional free length prolonging the useful clamping length of the rod beyond the bearing face of a retaining member is calculated on the basis of the extension force and of the elongation of the stretched rod.

In one embodiment, the elongation of an engagement length on which a gripping member comes into engagement in order to stretch the rod is calculated on the basis of the extension force and of the elongation of the stretched rod.

Before stretching, the rod is, in general, initially at rest. However, the present invention may also be applied to an already clamped and therefore prestressed clamping rod. For example, in order to carry out control after the clamping of the rod, for example periodic control, or to modify the prestress of a rod after control.

In one embodiment, in which the rod is initially prestressed and blocked by the retaining member, an extension force applied to the rod is increased progressively, along with a relative measurement of the elongation of the rod in relation to the prestressed rod before extension, comparing the value supplied by the sensor with the initial value, the change in the extension force/elongation relation is controlled until a break in gradient indicating that the extension force has overshot the initial prestress of the rod is detected, then a reference value which would be indicated by the sensor for the clamping rod at rest is determined, as a function of the change in the extension force/elongation relation beyond said break in gradient, and this new value is used as a reference value for the relative measurements of the elongation of the rod and for controlling the tension of the rod.

One embodiment relates to a device for carrying out a method for controlling the tension of a clamping rod, comprising an actuator, a force sensor and a rod elongation sensor. The device comprises a calculation unit capable of receiving an output signal from the elongation sensor and an output signal from the force sensor, the unit comprising a module capable of calculating a data item representing the useful clamping length of the stretched rod and of the rod after release, by comparing values supplied by the elongation sensor during extension and after release with a reference value supplied by this sensor before extension, the module being capable, furthermore, of deducing from said calculations a residual prestressing or clamping force in a useful clamping length of the rod. This makes it possible, in particular, to determine accurately whether the rod is correctly prestressed after release.

What is meant here by a rod elongation sensor is a sensor capable of measuring directly the elongation of said rod or of measuring the displacement of the upper end of the rod.

In one embodiment, the unit comprises a module capable of calculating the elongation of the rod.

The unit may comprise a module capable of calculating the displacement of the upper end of the rod.

In one embodiment, the device comprises an interface for the acquisition of parameters of the rod and of the actuator, and memory means for storing these parameters.

BRIEF DESCRIPTION OF THE DRAWINGS

The present invention and its advantages will be understood more clearly from a study of the detailed description of an embodiment taken as an in-no-way-limiting example and illustrated by the accompanying figures in which.

DETAILED DESCRIPTION OF THE PREFERRED EMBODIMENTS

Figure 1:
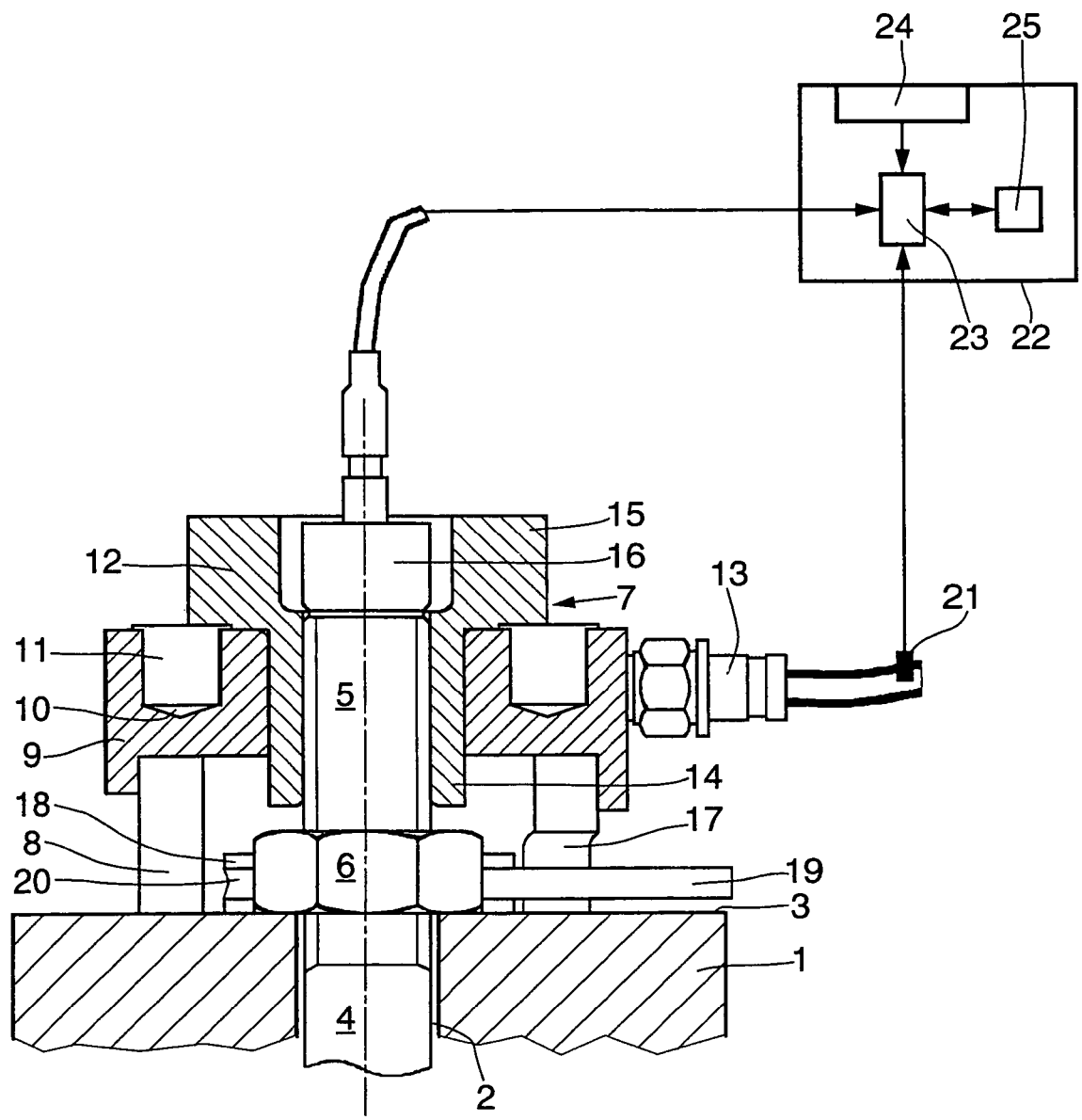
FIG. 1 illustrates a diagrammatic view of a prestressing device comprising an actuator seen in section and arranged at a threaded end of a clamping rod.

In FIG. 1, a component to be clamped 1 has a passage 2 issuing on the side of a bearing surface 3 of the component 1. The component 1 may, of course, comprise a stack of components to be assembled. A clamping rod 4 is arranged in the passage 2 and has a threaded end 5 projecting on the side of the bearing surface 3. A nut 6 is engaged on the threaded end 5 until it comes into contact with the bearing surface 3.

A device for tensioning the rod and for control comprises an actuator, designated as a whole by the reference number 7 and arranged between the component 1 and the threaded end 5 of the rod 4 so as to exert an axial extension force on the rod 4.

The actuator 7, such as a hydraulic jack and having a general annular shape, is arranged around the threaded end 5 of the rod 4. The actuator 7 comprises a force absorption skirt 8, and a cylinder 9, in which is formed an annular chamber 10 closed on one side by means of a piston 11 capable of sliding axially in relation to the cylinder 9, at the same time driving a gripping brace 12. The actuator 7 comprises feed means 13 for delivering a fluid under pressure into the chamber 10. The brace 12 has a tubular axial portion 14 sliding in a central passage formed at the center of the cylinder 9, the axial portion 14 having a threaded bore capable of being screwed onto the threaded end 5 of the rod 4. The brace 12 possesses, furthermore, a crown 15 projecting radially outward, on a zone of larger diameter on which the piston 11 can act.

As illustrated in FIG. 1, the actuator 7 is arranged such that the force absorption skirt 8 is in bearing contact against the bearing surface 3 of the component 1, the cylinder 9 being in bearing contact on the skirt 8 on the opposite side to the component 1, the piston 11 being displaceable on the opposite side to the component 1, at the same time driving the brace 12. The brace 12 is screwed onto the threaded end 5.

An elongation sensor 16 is arranged at the end of the rod 4. As illustrated here, this sensor 16 may be an ultrasonic sensor. Any other type of sensor capable of supplying a signal varying as a function of the elongation of the rod or of the displacement of the top of the rod could be provided, such as, for example, a tracer-type sensor, a comparator or an inductive sensor. As regards elongation measurement by a tracer-type sensor, the rod must be equipped with a measuring gage placed in the central hole. It is also conceivable to replace the sensor 16 by a sensor (not illustrated), for example a gage, making it possible to determine an extension force directly and being locatable axially between the piston 11 and the brace 12 or even between the skirt 8 and the cylinder 9.

So that the nut 6 can be brought into contact manually when the rod 4 is stretched, the force absorption skirt 8 is equipped with an orifice 17. Means for screwing the nut 6 comprise a ring 18 arranged around the nut and having an inner surface matched in shape with the outer surface of the nut 6 and an actuating lever 19 passed through the orifice 17 and inserted into ports 20 provided on the periphery of the ring 18. Of course, it is also conceivable to provide motorized means, which may be automated, in order to carry out the screwing of the nut 6, entailing a substantially different configuration of the skirt 8 in order to allow the adaptation of said means.

To introduce an axial prestress into the rod 4, a fluid under pressure is delivered into the chamber 10 of the cylinder 9. The cylinder 9 is retained by the force skirt 8 bearing against the bearing surface 3 of the component 1. The fluid under pressure in the chamber 10 generates on the piston 11 an axial force proportional to the pressure of the fluid and to the area of the projection of the surface of the piston enclosed in the chamber 10 projected in a radial plane. The piston 11 is subjected axially to displacement on the opposite side to the bearing surface, at the same time driving the brace 12. The brace 12, engaged with the threaded end 5 of the rod 4, transmits the extension force to the rod. When the rod is stretched, the means of bringing into contact 18 and 19 are used to bring the nut 6 into contact with the bearing surface 3 of the component 1, at the same time causing the nut 6 to rotate with the aid of the lever 19 and the ring 18. Subsequently, the extension force exerted by the actuator 7 is released. The rod 4, which was previously stretched by the actuator 7, tends to contract, but is retained by the nut 6 bearing on the component 1. The result of this is that a residual force remains in the rod 4, making it possible to clamp the component 1.

The device for tensioning and control comprises a second sensor 21, a signal of which represents the force applied by the actuator 7. The second sensor is provided here in the form of a pressure sensor arranged on the means 13 for the feed of fluid under pressure.

The signals from the first and second sensors 16 and 21 are transmitted to a central unit 22 which comprises a processing module 23 capable of calculating a relative value of the elongation of the clamping length of the rod 4 in the stretched state, of recording or determining a tensile or extension force applied to the rod 4 as a function of a signal from the second pressure sensor 21, and of recording the relative value of the elongation of the clamping length of the rod after release. Finally, the processing module 23 is capable, furthermore, of deducing from said calculations, determinations and recordings a residual clamping force in the useful clamping length of the rod 4, this making it possible to determine accurately whether the rod 4 is correctly prestressed after release. The device comprises an interface 24 for the acquisition of parameters of the rod 4, of the nut 6 and of the actuator 7, and memory means 25 for storing these parameters.

Figure 2:
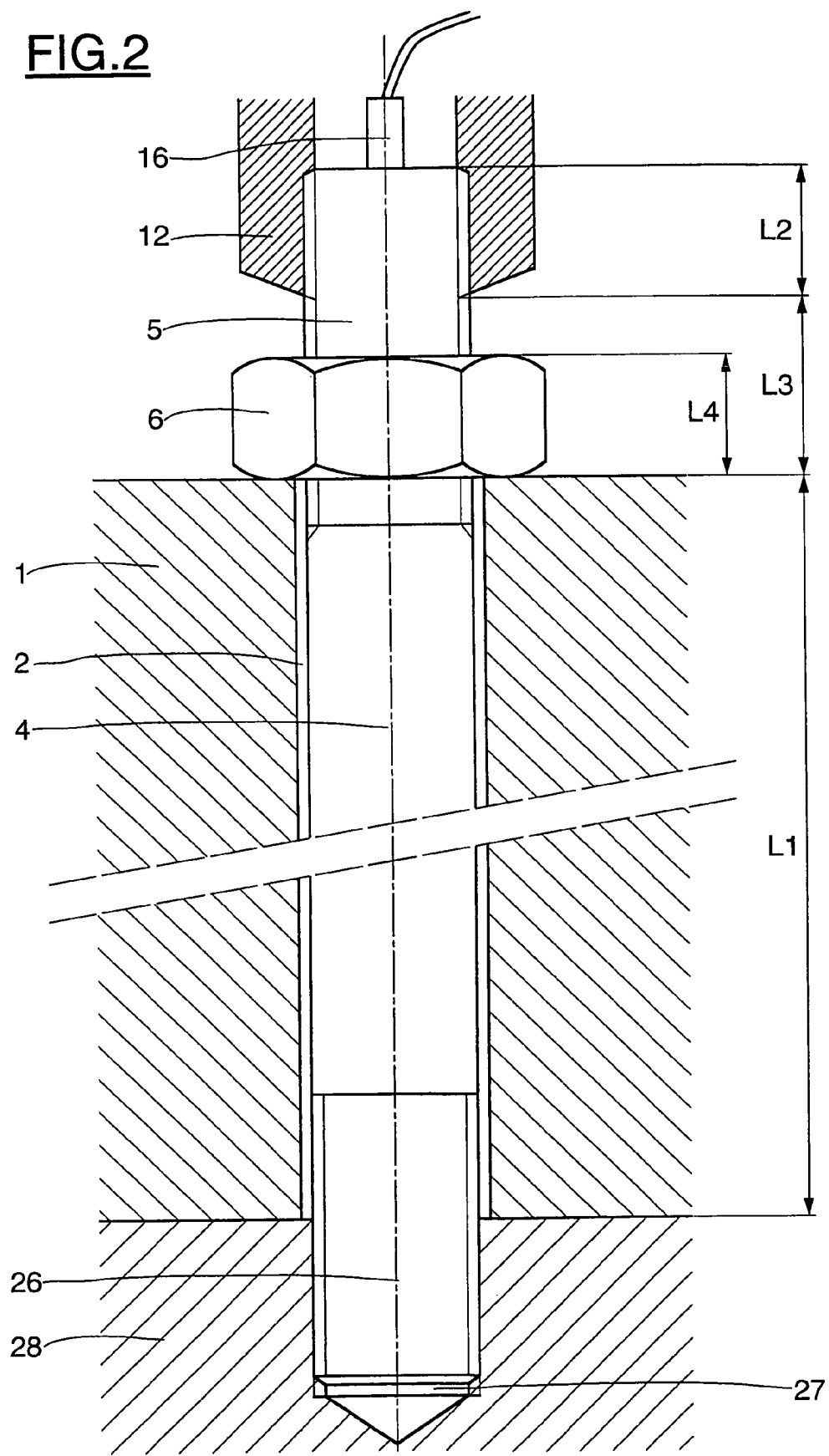
FIG. 2 is a diagrammatic view in axial section of a rod threaded at its two ends, one end being screwed in a first component and the other end being received by a nut forming the retaining member.

In FIG. 2, the rod 4 comprises, on the opposite side to the first threaded end 5, a second threaded end 26 projecting from the passage 2 of the component 1 and engaged in a corresponding threaded bore 27 provided in a second component 28, against which the first component 1 bears on the opposite side to the bearing surface 3.

Several lengths may be distinguished in the rod 4, as illustrated by the dimensions L1, L2, L3 and L4 located on the side of the rod 4. What is meant here by length in the rod 4 is portions of the rod 4 which have a predetermined length.

The useful clamping length L1 is located between the second threaded end screwed in the component 28 and the nut 6 in a position brought into contact against the bearing surface. The useful length L1 is the length in which the residual prestressing or clamping force exerted on the assembled components 1, 2 persists. In other words, the useful length.

A first engagement length L2 is the length in engagement with the gripping brace 12. An additional free length L3 is the portion of the rod which is located between the useful length L1, or the bearing face of the nut 6, and the first engagement length L2. A second engagement length L4 is the portion of the first threaded end which is engaged with the nut 6.

Let steps in prestressing a clamping rod initially at rest be considered below, the numerical references of FIGS. 1 and 2 being readopted.

With the rod 4 being at rest, the processing module 23 records a signal or reference value $V_I$ supplied by the sensor 16. This reference value $V_I$ is recorded without prior calibration. It represents the length of the rod, but may nevertheless have a greater or lesser error if the true length of the rod is considered.

Subsequently, the actuator 7 is controlled so as to apply an extension or a tensile force to the rod 4 by means of the brace 12 acting on the first end 5 or upper end. The rod 4 thus stretched is elongated. The processing module 23 records the signal from the second pressure sensor 21 (FIG. 1) and from this deduces the extension force $F_H$ applied to the rod 4. The processing module 23 simultaneously records the total elongation value $V_H$ supplied by the first sensor 16.

Subsequently, after an operator has brought the nut 6 into contact against the bearing surface, or after motorized bringing into contact, the actuator 7 is controlled so as to release the rod 4. The rod 4, although blocked by the nut 6, partially contracts. The processing module 23 records the residual value $V_O$ supplied by the first sensor 16.

On the basis of these data and of stored data relating to the rod 4, to the nut 6 and to the actuator 7, in particular the brace 12, the processing module 23 determines a residual clamping prestressing force of the useful clamping length L1 of the rod 4.

A value representing the elongation $\Delta L_H$ of the rod 4 subjected to the tensile force is supplied by the difference between the reference value $V_I$ and the total value $V_H$ which are supplied by the sensor 16 according to the following equation:

$$\Delta L_H = V_H - V_I \qquad \text{Equation (1)}$$

This total elongation of the rod 4 subjected to tensile force corresponds mainly to the sum of the elongation $\Delta L_U$ of the useful length L1, of the elongation $\Delta L_S$ of the additional free length L3 and of the elongation $\Delta L_P$ of the first engagement length L2 according to the following equation:

$$\Delta L_H = \Delta L_U + \Delta L_P + \Delta L_S \qquad \text{Equation (2)}$$

The elongation $\Delta L_S$ of the additional free length L3 can easily be determined with a high level of accuracy from the following equation:

$$\Delta L_S = \frac{F_H \cdot L_S}{A_S \cdot E} \qquad \text{Equation (3)}$$

where:

$F_H$ is the extension force exerted on the rod by the actuator, $L_S$ is the length of the additional free length L3, $A_S$ is an equivalent area of the additional free length, taking into account the thread of the latter, and E is the Young's modulus under tensile force of the material forming the rod 4.

The elongation of the length L2 in engagement with the brace 12 may likewise be determined from the following equation:

$$\Delta L_P = \frac{F_H \cdot K_1 \cdot L_P}{A_P \cdot E} \qquad \text{Equation (4)}$$

where:

$F_H$ is the extension force exerted by the actuator, $L_P$ is the length of the length L2 of the rod in engagement with the brace 12, $A_P$ is the equivalent area of the length in engagement with the brace 12, E is the Young's modulus of the material forming the threaded rod 4, and $K_1$ is a correction coefficient linked to the shape of the brace 12.

It is necessary, in fact, to provide a correction coefficient $K_1$, since the force transmitted by the brace 12 to the first engagement length L2 is distributed along said length L2, and the result of this is that the deformation is not uniform. It is thus clear that the deformation is greater in a zone located on the side of the useful length L1, which undergoes virtually the entire force applied, than on the side of the free end of the rod 4 which undergoes only part of the force applied. Consequently, an equivalent mean force equal to the product of the applied extension force $F_H$ and the correction coefficient $K_1$ is determined. The correction coefficient $K_1$ depends on the geometry of the rod 4, on that of the brace 12, in particular its height, on the thread profile and, if appropriate, on the materials forming these elements. Customary correction coefficients may be found in the literature. The calculation accuracy is not impaired by the use of such an approximation.

By the above equations being combined, the processing module 23 is capable of calculating with a very good approximation the elongation $\Delta L_U$ of the useful clamping length L1 when the rod 4 is subjected to the extension force. The processing module 23 applies the following equation:

$$\Delta L_U = (V_H - V_I) - \frac{F_H \cdot L_S}{A_S \cdot E} - \frac{F_H \cdot K_1 \cdot L_P}{A_P \cdot E} \qquad \text{Equation (5)}$$

Subsequently, with the rod 4 being released, the residual elongation $\Delta L_R$ of the rod 4 is given by the difference between the reference value $V_I$ and the new given value $V_R$ determined by the first sensor 16, according to the following equation:

$$\Delta L_R = V_R - V_I \qquad \text{Equation (6)}$$

This elongation $\Delta L_R$ corresponds essentially to the sum of the residual elongation $\Delta L_{UR}$ of the useful length L1 and of the residual elongation $\Delta L_E$ of the second engagement length L4 which is in engagement with the nut. The portion of the first threaded end 5 of the rod 4 which is located beyond the nut 6 then undergoes no tensile force. In other words, said portion of the first threaded end 5 corresponds to the engagement length L2 and to the additional length L3 less the engagement length L4.

The residual elongation $\Delta L_R$ can therefore be obtained by means of the following equation:

$$\Delta L_R = \Delta L_{UR} + \Delta L_E \qquad \text{Equation (7)}$$

As before for the first engagement length L2, the elongation of the second engagement length L4 with the nut can be estimated from the following equation:

$$\Delta L_E = \frac{F_O \cdot K_2 \cdot L_E}{A_E \cdot E} \quad \text{Equation (8)}$$

where:

$F_O$ is the residual clamping force in the useful clamping length of the rod 4, $L_E$ is the length of the length in engagement with the nut 6, $A_E$ is the equivalent area of the second engagement length L4, E is the Young's modulus of the material forming the threaded rod 4, and $K_2$ is a correction coefficient.

The correction coefficient $K_2$ depends on the geometry of the rod 4, on that of the nut 6, in particular its height, on the thread profile and, if appropriate, on the materials forming these elements. Customary correction coefficients may be found in the literature.

The processing module 23 can therefore calculate with a very good approximation the residual elongation $\Delta L_{UR}$ of the useful clamping length L1 after the release of the rod from the following equation:

$$\Delta L_{UR} = (V_R - V_I) - \frac{F_O \cdot K_2 \cdot L_E}{A_E \cdot E} \quad \text{Equation (9)}$$

Subsequently, in view of the fact that the deformations of the rod take place in the elastic range of the material and these deformations are therefore proportional to the force applied, the processing module 23 can determine the residual force in the useful clamping length from the following equation:

$$\frac{F_H}{\Delta L_U} = \frac{F_O}{\Delta L_{UR}} \quad \text{Equation (10)}$$

The following final equation can be deduced from this, giving $F_O$ the desired or prestressed residual clamping force:

$$F_O = F_H \cdot \frac{(V_R - V_1)}{\left(\Delta L_U + F_H \cdot \frac{K_2 \cdot L_E}{A_E \cdot E}\right)} \quad \text{Equation (11)}$$

where all the variables have been determined by means of measurements from the sensors or the preceding equations, in particular $\Delta L_U$ being given by the equation (5).

In the example of the rod 4 illustrated in FIGS. 1 and 2, the first threaded end 5 has a constant diameter, so that the equivalent area $A_P$ of the first engagement length L2 of the brace is equal to the equivalent area $A_S$ of the additional length L3 and to the equivalent area $A_E$ of the second engagement length L4 of the nut. Of course, the rod 4 could be different and have lengths of different diameters, separated, for example, by shoulders. In this case, the equivalent areas will be different. Furthermore, if the additional free length L3 has various portions of different diameters, it will be necessary in this case to distinguish each of the equivalent areas of these portions in the calculation of the elongation of the additional free length.

Moreover, the preceding equations do not take into account the deformation of the second threaded end 26 of the rod 4, the control method not having to take this into account.

Other particular cases may be envisaged, depending on whether the rod 4 is replaced by a screw equipped at its second end with a one-piece head or by a pin retained at its two ends by means of a nut.

The characteristics relating to the rod 4, the nut 6 and the brace 12 of the actuator can be reentered in the memory means 25 before the start of the method of tensioning the rod 4. It is necessary, in particular, to reenter the following values: the various lengths of the rod 4, the equivalent diameters of the lengths, the correction coefficients of the lengths in engagement with the brace 12 and the nut 6 (or the elements for calculating them), and the Young's modulus under tensile stress of the material of the rod.

These values can be reentered for each application. A value entry will be applicable to all the identical clamping rods of the same application. There may also be provision for the memory means 25 to contain sets of current values for current applications, and an operator can select from the prerecorded values those which correspond to a structure to be clamped and/or to be controlled.

Figure 3:
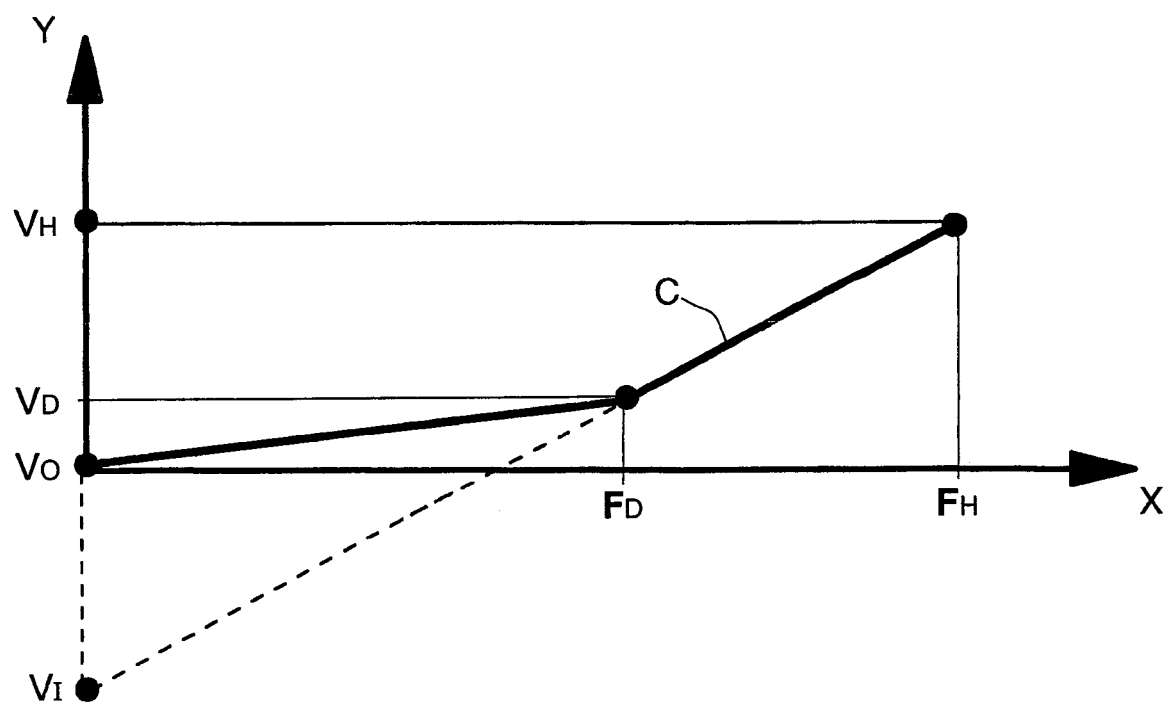
FIG. 3 is a graph illustrating output signals from an elongation sensor and from a force sensor when a method for controlling a rod having initial prestress is carried out, according to one aspect of the invention.

A control of the tensioning of a rod initially at rest was described above. The control method may also be applied to an already initially prestressed rod, as mentioned above and explained below with the aid of FIG. 3, with the references used for FIGS. 1 and 2 being readopted.

This last figure illustrates a graph provided with an abscissa axis X, on which is plotted the value supplied by the second sensor indicating the force applied to the rod, and with an ordinate axis Y, on which is plotted the value supplied by the first sensor indicating the elongation of the rod.

A curve C, which represents the change in the relation between the elongation and the tensile or extension force applied to the already clamped rod, is continuously linear in portions. The curve C is first linear over an interval between 0, corresponding to a zero tensile force and to an elongation indicated as zero by the sensor, and a first value $F_L$, corresponding to an elongation $V_L$ indicated by the sensor. Then, after a marked change in gradient, the curve C is linear with a higher gradient over an interval between the value $F_L$ and a final value $F_H$, corresponding to an elongation $V_H$ indicated by the sensor.

What can be seen clearly is the break in gradient in the curve characterizing the elongation/force relation when the tensile or extension force overshoots the first value $F_L$.

The initial prestress of the rod is not known at the outset. In a first step, as long as the applied force does not overshoot the initial prestress in the useful length, the useful length of the rod is not elongated under the effect of the tensile or extension force, the nut still remains in contact and only the portions of the rod which are located above the nut are elongated. In a second step, when the applied force overshoots the initial prestress, the nut begins to come loose from the face, and the rod as a whole is elongated, including the useful clamping length.

It will be appreciated that the first portion of the curve corresponds to the first step and that the second portion having a higher gradient corresponds to the second step.

Once the second step is reached, it is possible to determine by extrapolation the value $V_I$ which would be indicated by the first sensor if the rod were released so as to return to its position of rest, by prolonging the second portion of the curve toward the negative abscissa and ordinate so as to intersect the ordinate axis (as illustrated by dots in the figure). As shown in the figure, this value $V_I$ corresponding to an abscissa of zero applied force is thus determined on the ordinate axis.

In practice, the processing module can record several points on the two curved portions, carry out a linear regression in a known way so as to determine the gradient and therefore a linear equation giving a good approximation of these two portions, and determine the value $V_I$ by simple calculation.

Since the initial value $V_I$ is then known, this represents a return to the conditions of use of the method for an initially nonprestressed rod, and the preceding equations (1) to (11) can be employed.

Of course, such a method allowing the controlled clamping of a rod at rest in the initial state or allowing the control and/or reclamping of an already prestressed rod can be carried out by means of a device which will record the data, will receive the inputs, will ensure the calculations and will generate the appropriate commands for operating the actuator and for bringing into contact.

By virtue of the invention, therefore, a method for controlling tensile stress of a clamping rod is obtained, which is accurate and which can be carried out in a simple way, without the need for prior calibration.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method for controlling tensile stress of a rod used for clamping a component having a passage issuing on the side of a bearing surface, wherein the rod is placed in said passage of the component and has a threaded end projecting on the side of the bearing surface the rod is extended in an axial direction and at least one retaining member is engaged on the threaded end of the rod until it comes into contact with the bearing surface of the component with its bearing face before the rod is released, such that the rod is blocked at the two ends of a useful clamping length defined as the length in which the residual clamping force persists with a residual clamping tensile force, wherein measurements are made which represent an elongation of the rod in a stretched state under a measured extension force and of the rod after release in relation to the rod before extension, by measuring a reference value before extension, a value during extension and a value after release by at least one sensor and comparing values supplied the sensor during extension and after release with a reference value supplied by this sensor before extension, and, on the basis of these data, a residual clamping force in the useful clamping length of the released rod after extension is calculated.

2. The method as claimed in claim 1, wherein relative measurements of a displacement of the threaded end of the rod are carried out.

3. The method as claimed in claim 1, wherein relative measurements of the elongation of the rod are carried out.

4. The method as claimed in claim 3, wherein, with the rod being initially prestressed and blocked by the retaining member, an extension force applied to the rod is increased progressively, along with a relative measurement of the elongation of the rod in relation to the rod before extension, comparing the value supplied by the sensor with the initial value before extension, a change in a force/elongation relation between the elongation and the extension force is controlled until a break in gradient is detected, said break in gradient being detected when the extension force has overshot a first value corresponding to the initial prestress of the rod, a reference value which would be indicated by the sensor for the rod at rest is determined as a function of the change in the force/elongation relation beyond said break in gradient, and this new value is used as a reference value for the relative measurements of the elongation of the rod and for controlling the tension of the rod.

5. The method as claimed in claim 1, wherein the extension force is applied to the rod by means of a hydraulic actuator, and said extension force is calculated on the basis of a feed pressure measured by a second sensor.

6. The method as claimed in claim 1, wherein the residual clamping force in the useful clamping length of the released rod is determined as a function, of an extension force, of an elongation of the useful clamping length of the stretched rod and of a residual elongation of the useful length of the released rod.

7. The method as claimed in claim 6, wherein the residual clamping force in the useful clamping length of the released rod is calculated on the basis of the applied extension force multiplied by an elongation of the useful clamping length of the released rod and divided by an elongation of the useful clamping length of the stretched rod.

8. The method as claimed in claim 6, wherein the elongation of the useful clamping length of the stretched rod is deduced from the extension force and the elongation of the stretched rod.

9. The method as claimed in claim 6, wherein the elongation of the useful clamping length of the stretched rod is deduced as the elongation of the stretched rod, from which are subtracted an estimation of the elongation of an additional free length prolonging the useful clamping length of the rod beyond the bearing face of a retaining member and an estimation of the elongation of an engagement length on which a gripping member comes into engagement for the extension of the rod by means of an actuator, the engagement length being the length in engagement with the gripper members.

10. The method as claimed in claim 9, wherein the elongation of an additional free length prolonging the useful length of the rod beyond the bearing face of a retaining member is calculated on the basis of the extension force and of the additional free length.

11. The method as claimed in claim 6, wherein the elongation of an engagement length on which a gripping member comes into engagement in order to stretch the rod is calculated on the basis of the extension force and of the engagement length.

12. The method as claimed in claim 6, wherein the function includes a linear function.

13. The method as claimed in claim 1, wherein the residual elongation of the useful clamping length of the released rod is deduced as the residual elongation of the rod after release, from which are subtracted as estimation of the elongation of a second engagement length, that is calculated on the residual clamping force and the second engagement length.

14. A device for carrying out a method for controlling the tensile stress of a clamping rod, comprising an actuator, a force sensor and a rod elongation sensor, characterized in that it comprises a calculation unit capable of receiving an output signal from the elongation sensor and an output signal from the force sensor, the unit comprising a module capable of calculating a data item representing the elongation of the useful clamping length of the rod in a stretched state and after release, by comparing values supplied by the elongation sensor during extension and after release with a reference value supplied by this sensor for the rod in the state of rest, said useful clamping length being defined as the length in which the residual clamping force persists with a residual clamping tensile force, the module being capable, furthermore, of deducing from said calculations a residual clamping force in a useful clamping length of the rod.

15. The device as claimed in claim 14, wherein the unit comprises a module capable of calculating the elongation of the rod.

16. The device as claimed in claim 14, wherein the unit comprises a module capable of calculating the displacement of the threaded end of the rod.

17. The device as claimed in claim 14, wherein the device comprises an interface for the acquisition of parameters of the rod and of the actuator, and memory means for storing these parameters.

* * * * *